UNITED STATES PATENT OFFICE.

MARIE LOUIS EMILE BAUDIN, OF BESANCON, FRANCE.

PROCESS FOR THE EXTRACTION OF VALUES FROM HIGHLY-DILUTE SOLUTIONS.

1,375,441.        Specification of Letters Patent.        Patented Apr. 19, 1921.

No Drawing.        Application filed April 7, 1917.  Serial No. 160,568.

*To all whom it may concern:*

Be it known that I, MARIE LOUIS EMILE BAUDIN, a citizen of the Republic of France, and resident of Besancon, France, have invented a certain new and useful Process for the Extraction of Values from Highly-Dilute Solutions, of which the following is a specification.

It is well known that gold is present in the form of its compounds in sea water to the extent of about five centigrams per ton. Up to this time, it has been considered impossible to extract this gold on a commercial scale.

The main object of the invention is the extraction of these auriferous compounds from sea water, but the invention may be applied to other highly diluted solutions of gold and may also be applied to the extraction of certain other mineral compounds contained in sea water, some of which compounds will be extracted at the same time as the gold and constitute by-products of such value as to make the entire process commercially practicable. It is to be understood that for extracting compounds other than those of gold or when working with other solutions than sea water, the procedure or the reagents employed must be changed accordingly.

The compounds to be separated from water must be of such a nature as to give easily through contact with an insoluble reagent either an insoluble metal or oxid, or through contact with insoluble sulfids, selenids, tellurids, arsenids, antimonids, an insoluble substitution product. Generally speaking, therefore, the process is applicable to the salts of all metals other than the alkalis or the alkaline earths whose oxids are soluble.

The extraction is effected irrespective of the nature of the gold compound by means of prepared celluloses, effecting either reducing actions, substitution actions or actions of decomposition, analogous to those produced by the marine algæ on the surrounding medium, and which allow these algæ to accumulate industrially recoverable quantities of certain substances existing in sea water in a highly diluted state, such as iodin and phosphoric acid. The celluloses used are the hydro-celluloses and acting to take up the gold compounds, constitute colloid adsorbents. The adsorbent is coated on a fixing support which is immersed in the solution.

The fixing support should be formed first, by a colloidal material which will fix by adsorption a certain quantity of the gold compound; second, by a reagent (already present in the solution or added thereto) which acting on the adsorbed compound will precipitate the gold in the form of an insoluble compound. By the destruction of the compound which impregnated it, the colloidal support is practically renewed and can adsorb a new quantity of compound, which is in its turn destroyed, and so on until exhaustion of the faculty of the colloidal support of reacting on the adsorbed compound.

Of numerous substances of animal origin, silk, wool, hide, various albumins and other substances may be employed to form the colloid adsorbent. Among vegetable substances, cotton, hemp, flax, linen, ramie, etc., may be employed in the natural state or in the form of tissue, filaments, cloth, etc., as raw materials for making the colloid adsorbent. But, the preferred colloid adsorbent is one of the hydro-celluloses obtained from the regeneration of the cellulose previously dissolved in a suitable solvent, and preferably that obtained from a solution of xanthogenate of cellulose, known in the chemical industry as viscose. Experience has shown in fact that such cellulose possesses the property of adsorption in the highest degree, and further it possesses *per se* reducing properties which permit of its fixing two per cent. of its weight of gold.

The precipitation in the insoluble condition, a necessary complement of adsorption for obtaining a satisfactory yield may be obtained by the following methods given by way of example:

1. *Reduction.*—The reagents which will act at ordinary temperatures may be:—

A. Insoluble and incorporated in that state with the cellulose solution, for instance the various varieties of charcoal, particularly blood charcoal, which can fix 90% of its weight of gold in one operation, and up to 2000% by successive treatment; or also trioxymethylene or analogous substances.

B. Insoluble but incorporated in the form of solutions of their compounds with the coagulated cellulose or hydro-cellulose which experience has shown does thus adsorb much more of them. The following examples may be cited: the aldehydes (notably formaldehyde) certain phenols, as the various tannins (notably gallotannic acid) and their derivatives or analogues (gallic and pyrogallic acids, etc.), and finally certain metallic salts, such as ferrous and stannous salts.

However, experience has shown that ferrous and stannous salts, themselves oxidizing very easily, are inconvenient in practice and that tannin is advantageously replaced by the tannates of iron or better still, of antimony, products of double decomposition on the support itself.

*2. Substitution.*—In the presence of an insoluble and stable sulfid, those of lead or of mercury for example, gold compounds, themselves reducible only with difficulty, are precipitated in the sulfid condition and later as metallic gold. Obviously the sulfid can be added as such to the cellulose solution, or may be formed by double decomposition on the support itself. The insoluble selenids, antimonids, arsenids, tellurids would give an analogous result.

*3. Decomposition.*—A precipitate of oxid or hydrate of gold is obtained by the action of barium carbonate, which may previously exist in the solution, may be added thereto or may be formed by double decomposition.

It is to be noted that nearly all these reagents themselves play the part of suitable adsorbents, the action of which is added to that of the colloidal material.

Whether the gold be fixed in the metallic state, the oxid, the sulfid, etc., or simply adsorbed by any compound, it will be susceptible to known treatment with a dilute solution of alkaline cyanid (without deterioration of the fixing support) or by any other usual method.

In a similar manner to that employed in fixing gold, certain mineral compounds such as those of lead, copper, etc., may also be fixed on the hydro-cellulose. The charcoal will fix certain salts, particularly those of high molecular weight. The sulfids and also the reducing agents will fix the silver, etc.

The invention may be carried out in the following manner, given by way of example:—

*Preparation of the fixing support.*—To a dense solution of viscose is added blood charcoal amounting to five to ten per cent. of the weight of the cellulose, or ten to twenty per cent. of sulfid of lead, or finely pulverized sulfid of mercury. The desired support consisting of a piece of fine transparent muslin or other tissue, twine, raphia, thin plate, glass tube or other medium is coated with this mixture and the hydro-cellulose is coagulated by any of the usual methods, but preferably by heat. Instead of the first support regenerated hydro-cellulose in the form of a viscoid block may be used in the form of narrow strips or plates.

Should it be preferred to treat viscose alone in order to impregnate it after coagulation with insoluble sulfids, tannates or carbonates, one will have to immerse it after coagulation successively in two solutions of soluble salts that can give through mutual reaction an insoluble precipitate that will distribute itself in a finely divided state throughout all the pores of the coagulated viscose. Also formaldehyde may be fixed on cellulose or its derivatives by heating the said cellulose and formaldehyde with or without addition of acetic or sulfuric acid, or of soda, etc.

Finally the cellulose of the first or premier support is superficially transformed into xanthogenate, then without dissolving it, dissociating by heat or otherwise the compound formed and impregnated as above.

*Utilization of the prepared fixing support.*—The support is immersed during a period which varies from several weeks to some months according to the richness of the water and its renewal. When the enrichment is deemed sufficient, it is withdrawn for treatment, and replaced if desired by a new one, or by a previously treated support (reimpregnated if desired). It is obvious that in certain particular cases, the operation may be somewhat different: Thus, with the mother waters of salt-marshes or certain industrial waters, it may be necessary to drain the water across a more or less thick part of the fixing support, while methodically circulating the water.

*Treatment of the prepared fixing support.*

The treatment utilizes the following methods:

*1. Extraction of the gold.*—This is effected by the known method of cyaniding in a simple displacement apparatus. The silver which accompanies the gold is extracted at the same time.

*2. Extraction of other mineral compounds.*—These are afterward lixiviated with a dilute or weak acid solution which dissolves the greater part of the other fixed mineral compounds; this solution is utilized for successive operations until the enrichment is sufficient for extraction by concentration or by other suitable known methods. In this case, re-impregnation of the sulfids, tannates, carbonate of barium, etc., if necessary afterward takes place. In the case of blood charcoal, the fixing support is reutilized many times.

*3. Extraction of all the fixed compounds.*—This method is employed when the fixing support is recognized as useless; this is incineration. All the fixed compounds which sublime may be recovered by extraction according to the usual methods employed in chemistry.

What is claimed is:

1. The process of extracting mineral compounds from highly diluted solutions thereof, which consists in producing a support having a colloidal adsorbent coated on the surface thereof, and in bringing the highly diluted solution in contact with said adsorbent.

2. The process of extracting mineral compounds from highly diluted solutions thereof, which consists in forming a fixing support having a colloidal substance thereon adsorptive of the compound, and having a reagent incorporated with the colloid for converting the adsorbed soluble compound into an insoluble compound, and in bringing the highly diluted solution into contact with the support.

3. The process of extracting gold from sea water, which consists in producing a support, said support carrying a coating of viscose physically combined with a fixing reagent, and immersing the support so formed into sea water to convert the gold compound dissolved therein into insoluble compounds.

4. The process of recovering gold dissolved in sea water, including making a fixing support with a colloidal coating thereon, said coating having the properties of adsorption and of reduction, adding a reagent to the coating capable of acting upon the adsorbed gold compound to convert it into an insoluble compound, and bringing the support so formed into contact with the sea water.

5. The process of recovering gold dissolved in sea water, comprising making a fixing support with a colloidal coating thereon, said coating having properties of adsorption and of reduction, adding blood charcoal to the colloidal coating, and bringing the support so formed into contact with sea water.

6. The process of recovering gold dissolved in sea water, comprising making a fixing support with a colloidal coating thereon of hydro-cellulose, adding a reagent capable of acting upon the adsorbed gold compound to convert it into an insoluble compound, and bringing the support so formed into contact with the water.

7. The process of recovering gold dissolved in sea water, comprising making a fixing support with a coating of hydro-cellulose thereon, said coating having properties of adsorption and of reduction, adding blood charcoal to the coating for reaction with the adsorbed gold compound, and bringing the support so formed into contact with the sea water.

8. The process of recovering gold dissolved in sea water, comprising making a fixing support, said fixing support consisting of a sheet of muslin coated with a coagulated hydro-cellulose, said coating also comprising a reagent capable of acting upon the adsorbed gold compound to convert it into an insoluble compound, and bringing the support so formed into contact with water.

9. The process of recovering gold dissolved in sea water, comprising making a fixing support, said fixing support including a sheet of textile material coated with a mixture of viscose and blood charcoal, and bringing the support so formed into contact with water.

10. The process of extracting mineral compounds from highly diluted solutions thereof, which consists in producing a support, said support having a cellulosic product thereon, the cellulosic product having the properties of both adsorption and of reduction of the mineral compound being extracted, and in bringing the highly diluted solution in contact with the cellulosic product.

11. The process of extracting mineral compounds from highly diluted solutions thereof, which consists in producing a support, said support having coagulated hydro-cellulose thereon, the coagulated hydro-cellulose having the properties of both adsorption and of reduction of the mineral compound being extracted, and in bringing the highly diluted solution in contact with the cellulosic product.

In testimony whereof I have hereunto signed my name.

MARIE LOUIS EMILE BAUDIN.